(12) United States Patent
Palanisamy

(10) Patent No.: US 9,942,043 B2
(45) Date of Patent: Apr. 10, 2018

(54) TOKEN SECURITY ON A COMMUNICATION DEVICE

(71) Applicant: Visa International Service Association, San Francisco, CA (US)

(72) Inventor: Karthikeyan Palanisamy, Dublin, CA (US)

(73) Assignee: Visa International Service Association, San Francisco, CA (US)

( * ) Notice: Subject to any disclaimer, the term of this patent is extended or adjusted under 35 U.S.C. 154(b) by 250 days.

(21) Appl. No.: 14/694,210

(22) Filed: Apr. 23, 2015

(65) Prior Publication Data
US 2015/0312038 A1 Oct. 29, 2015

Related U.S. Application Data

(60) Provisional application No. 61/983,343, filed on Apr. 23, 2014.

(51) Int. Cl.
*H04L 9/32* (2006.01)
*G06Q 20/38* (2012.01)
(Continued)

(52) U.S. Cl.
CPC ............ *H04L 9/3213* (2013.01); *G06F 21/33* (2013.01); *G06F 21/44* (2013.01); *G06Q 20/385* (2013.01);
(Continued)

(58) Field of Classification Search
CPC . H04L 9/3213; H04L 9/3242; H04L 63/0428; H04L 63/0807; G06F 21/33; G06F 21/44; G06Q 20/385
See application file for complete search history.

(56) References Cited

U.S. PATENT DOCUMENTS 5,613,012 A   3/1997 Hoffman et al.
5,781,438 A   7/1998 Lee et al.
(Continued)

FOREIGN PATENT DOCUMENTS

EP   2156397 A1   2/2010
WO   2001035304 A1   5/2001
(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
(Continued)

*Primary Examiner* — Mohammed Waliullah
(74) *Attorney, Agent, or Firm* — Kilpatrick Townsend & Stockton LLP

(57) ABSTRACT

Techniques for enhancing the security of storing sensitive information or a token on a communication device may include sending a request for the sensitive information or token. The communication device may receive a session key encrypted with a hash value derived from user authentication data that authenticates the user of the communication device, and the sensitive information or token encrypted with the session key. The session key encrypted with the hash value, and the sensitive information or token encrypted with the session key can be stored in a memory of the communication device.

18 Claims, 6 Drawing Sheets

(51) Int. Cl.
*G06F 21/33* (2013.01)
*G06F 21/44* (2013.01)
*H04L 29/06* (2006.01)

(52) U.S. Cl.
CPC ........ *H04L 9/3242* (2013.01); *H04L 63/0428* (2013.01); *H04L 63/0807* (2013.01)

(56) References Cited

U.S. PATENT DOCUMENTS

| | | |
|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,327,587 B1 | 12/2001 | Forster |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B1 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,774,611 B2 * | 8/2010 | Muntz ................ G06F 21/6209 713/182 |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |

(56) References Cited

U.S. PATENT DOCUMENTS

| | | |
|---|---|---|
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,707,404 B2 * | 4/2014 | Sorotokin ............ H04L 9/3213 713/155 |
| 8,751,391 B2 | 6/2014 | Freund |
| 8,762,263 B2 | 6/2014 | Gauthier et al. |
| 8,838,982 B2 | 9/2014 | Carlson et al. |
| 8,887,308 B2 | 11/2014 | Grecia |
| 8,959,347 B2 * | 2/2015 | Gupta ................ H04L 63/0428 713/170 |
| 9,065,643 B2 | 6/2015 | Hurry et al. |
| 9,070,129 B2 | 6/2015 | Sheets et al. |
| 9,160,741 B2 | 10/2015 | Wentker et al. |
| 9,191,375 B2 * | 11/2015 | Kaler ...................... G06F 21/41 |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0206709 A1 | 9/2006 | Labrou et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 * | 10/2007 | Chan ................... H04L 63/0823 726/12 |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |

(56) References Cited

U.S. PATENT DOCUMENTS

| | | |
|---|---|---|
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder II, et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |

(56) References Cited

U.S. PATENT DOCUMENTS

| | | | |
|---|---|---|---|
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0007299 A1* | 1/2015 | Grajek ............... H04L 63/0815 726/8 |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1* | 1/2015 | Dill .................... G06Q 20/385 705/44 |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1* | 7/2015 | Kumnick ........... G06Q 20/3674 705/67 |
| 2015/0220917 A1 | 8/2015 | Aabye et al. |
| 2015/0269566 A1 | 9/2015 | Gaddam et al. |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |

FOREIGN PATENT DOCUMENTS

| | | | |
|---|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed on May 19, 2014.

Sharma et al., U.S. Appl. No. 62/003,717 (unpublished), Mobile Merchant Application filed on May 28, 2014.

Kalgi et al., U.S. Appl. No. 62/024,426, (unpublished) Secure Transactions Using Mobile Devices filed on Jul. 14, 2014.

Prakash et al., U.S. Appl. No. 62/037,033 (unpublished), Sharing Payment Token filed on Aug. 13, 2014.

Hoverson et al., U.S. Appl. No. 62/038,174 (unpublished), Customized Payment Gateway filed on Aug. 15, 2014.

Wang, U.S. Appl. No. 62/042,050 (unpublished), Payment Device Authentication and Authorization System filed on Aug. 26, 2014.

Gaddam et al., U.S. Appl. No. 62/053,736 (unpublished), Completing Transactions Without a User Payment Device filed on Sep. 22, 2014.

Patterson, U.S. Appl. No. 62/054,346 (unpublished), Mirrored Token Vault filed on Sep. 23, 2014.

Dimmick, U.S. Appl. No. 14/952,514 (unpublished), Systems Communications With Non-Sensitive Identifiers filed on Nov. 25, 2015.

Dimmick, U.S. Appl. No. 14/952,444 (unpublished), Tokenization Request Via Access Device filed on Nov. 25, 2015.

Prakash et al., U.S. Appl. No. 14/955,716 (unpublished), Provisioning Platform for Machine-To-Machine Devices filed on Dec. 1, 2015.

Wong et al., U.S. Appl. No. 14/966,948 (unpublished), Automated Access Data Provisioning filed on Dec. 11, 2015.

Stubbs et al., U.S. Appl. No. 62/103,522 (unpublished), Methods and Systems for Wallet Provider Provisioning filed on Jan. 14, 2015.

Mcguire, U.S. Appl. No. 14/600,523 (unpublished), Secure Payment Processing Using Authorization Request filed on Jan. 20, 2015.

Flurscheim et al., U.S. Appl. No. 15/004,705 (unpublished), Cloud-Based Transactions With Magnetic Secure Transmission filed on Jan. 22, 2016.

Flurscheim et al., U.S. Appl. No. 62/108,403 (unpublished), Wearables With NFC HCE filed on Jan. 27, 2015.

Sabba et al., U.S. Appl. No. 15/011,366 (unpublished), Token Check Offline filed on Jan. 29, 2016.

Patterson, U.S. Appl. No. 15/019,157 (unpublished), Token Processing Utilizing Multiple Authorizations filed on Feb. 9, 2016.

Cash et al., U.S. Appl. No. 15/041,495 (unpublished), Peer Forward Authorization of Digital Requests filed on Feb. 11, 2016.

Le Saint et al., U.S. Appl. No. 15/008,388 (unpublished), Methods for Secure Credential Provisioning filed on Jan. 27, 2016.

Kinagi, U.S. Appl. No. 62/117,291 (unpublished), Token and Cryptogram Using Transaction Specific Information filed on Feb. 17, 2015.

Galland et al. U.S. Appl. No. 62/128,709 (unpublished), Tokenizing Transaction Amounts filed on Mar. 5, 2015.

Rangarajan et al., U.S. Appl. No. 61/751,763 (unpublished), Payments Bridge filed on Jan. 11, 2013.

Li, U.S. Appl. No. 61/894,749 (unpublished), Methods and Systems for Authentication and Issuance of Tokens in a Secure Environment filed on Oct. 23, 2013.

Aissi et al., U.S. Appl. No. 61/738,832 (unpublished), Management of Sensitive Data filed on Dec. 18, 2012.

Wong et al., U.S. Appl. No. 61/879,362 (unpublished), Systems and Methods for Managing Mobile Cardholder Verification Methods filed on Sep. 18, 2013.

Powell, U.S. Appl. No. 61/892,407 (unpublished), Issuer Over-The-Air Update Method and System filed on Oct. 17, 2013.

(56) References Cited

OTHER PUBLICATIONS

Powell, U.S. Appl. No. 61/926,236 (unpublished), Methods and Systems for Provisioning Mobile Devices With Payment Credentials and Payment Token Identifiers filed on Jan. 10, 2014.

Alqattan et al., "A Two-Factor Authentication System using Mobile Devices to Protect Against Untrusted Public Computers", Department of Electrical and Computer Engineering:, University of British Columbia, Canada (Jan. 2007) http://courses.ece.ubc.ca/412/term_project/reports//2007-fall/A_Two-Factor_Authentication_System_Using_Mobile%20_Devices_to_Protect_against_Untrusted_Public_Computers.pdf.

Saha et al., Survey of Strong Authentication Approaches for Mobile Proximity and Remote Wallet Applications—Challenges and Evolution, Cornell University Library (Dec. 9, 2014) http://arxiv.org/abs/1412.2845.

\* cited by examiner

TOKEN SECURITY ON A COMMUNICATION DEVICE

CROSS-REFERENCES TO RELATED APPLICATIONS

This application claims the benefit of priority to U.S. Provisional Application No. 61/983,343 filed on Apr. 23, 2014, which is herein incorporated by reference in its entirety for all purposes.

BACKGROUND

Sensitive information such as an account identifier is typically stored in a secure element of a communication device to protect the sensitive information. Examples of a secure element may include a subscriber identity module (SIM) card or a specialized integrated chip embedded into the communication device. A secure element is considered secure because information is stored in tamper-resistant hardware, which protects the information from malware or viruses that can infect the operating system or an application running on the communication device. However, the secure element of a communication device is typically under the control of a network operator such as a mobile network operator (MNO). In order to gain access to the secure element to provision sensitive information to the secure element, an entity wishing to do so may have to establish commercial agreements and technical connectivity with the party controlling the secure element to perform over-the-air (OTA) personalization of the secure element. This is both a cumbersome and complex process. Furthermore, incorporating a secure element adds to the manufacturing cost of the communication device, and increases the cost of the finished communication device. Thus, in some cases, it would be desirable to not rely on the use of a secure element to store sensitive information on a communication device. However, if a secure element is not used to protect the sensitive information, security of the sensitive information will be a concern.

Embodiments of the invention address this and other problems, both individually and collectively.

BRIEF SUMMARY

Embodiments of the present invention relate to techniques for enhancing the security of storing sensitive information on a communication device. In some embodiments, the techniques can be used to enhance the security of storing a token on a communication device.

In some embodiments, a process for enhancing the security of storing sensitive information or a token on a communication device may include sending a request for the sensitive information or token. The communication device may receive a session key encrypted with a hash value derived from user authentication data that authenticates the user of the communication device, and the sensitive information or token encrypted with the session key. The session key encrypted with the hash value, and the sensitive information or token encrypted with the session key can be stored in a memory of the communication device.

In some embodiments, a process for enhancing the security of storing sensitive information or a token on a communication device may include receiving, by a token request computer, a request for sensitive information or a token from the communication device, and sending the request to a token server. The token request computer may receive a session key associated with the request, and the sensitive information or token encrypted with the session key. The token request computer may encrypt the session key with a hash value derived from user authentication data for authenticating a user of the communication device, and send the session key encrypted with the hash value, and the token encrypted with the session key to the communication device.

These and other embodiments of the invention are described in further detail below.

DETAILED DESCRIPTION

Figure 1:
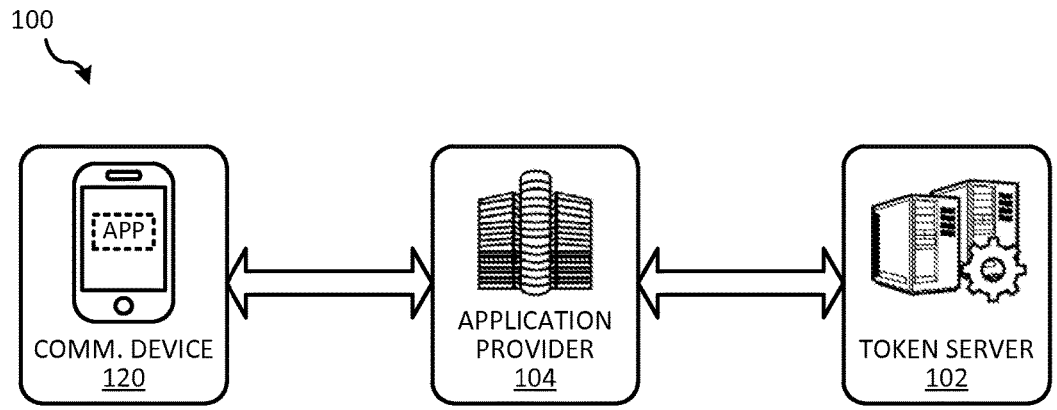
FIG. 1 illustrates a block of a system for requesting a token or sensitive information, according to some embodiments.

Embodiments of the present invention relate to techniques for enhancing the security of storing sensitive information on a communication device. In some embodiments, the techniques can be used to enhance the security of storing a token on a communication device. A token is a substitute for sensitive information and can be provided in place of the sensitive information when the sensitive information is transmitted or used. For example, a token can be a substitute for a real account identifier, and the token can be provided in place of the real account identifier to identify the underlying account to conduct a transaction. By allowing a token to be used in place of the sensitive information, sensitive information such as a real account identifier need not be permanently stored on the communication device, and the threat of compromising the sensitive information can be reduced.

However, even in implementations in which a token is used in place of the sensitive information, if the token is not stored in a secure element, a threat still exists that the token can be compromised and be used in an unauthorized manner. To protect the token or sensitive information outside the confines of a secure element, embodiments of the present invention stores the token or sensitive information in an encrypted form on the communication device. The token or sensitive information can be decrypted at runtime when used by an application installed on the communication device. When the application becomes inactive on the communication device, the decrypted token or sensitive information can be removed from the communication device (e.g., deleted from memory) such that the decrypted token or sensitive information is only temporarily available on the communication device. In this manner, static storage of the token or sensitive information in their decrypted form on the communication device can be prevented. Furthermore, when the communication device is rebooted or power cycled, the encrypted token or sensitive information previously provisioned or provided to the communication device can be deleted and wiped from the memory of the communication device. In the token scenario, the previously provisioned token will become invalid, and can no longer be used as a substitute for the sensitive information. A new token can be requested from a token server (e.g., a network token system) to replace the previously provisioned token. In this manner, the token becomes mutable and dynamically changes over time when the communication device is rebooted or power cycled such that even if a particular token is compromised, the compromised token will only be valid for a limited time.

Prior to discussing embodiments of the invention, description of some terms may be helpful in understanding embodiments of the invention.

A "communication device" may be a device that includes one or more electronic components (e.g., an integrated chip) that can communicate with another device. A "portable communication device" may be one form of a communication device that can be transported and operated by a user. A portable communication device may provide remote communication capabilities to a network, and can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable computing device (e.g., watch), electronic reader device, etc., or in the form of a card (e.g., smart card) or a fob, etc. Examples of portable communication devices may also include portable computing devices (e.g., laptop, netbook, ultrabook, etc.). A portable communication device may also be in the form of a vehicle (e.g., an automobile such as car) equipped with communication and/or network connectivity capabilities.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

"Sensitive information" may refer to information for which protection from unauthorized usage is desired, or information for which privacy protection is desired. For example, sensitive information may refer to confidential information, or may refer to information that can be used by an unauthorized entity to commit fraud such as fraudulent transactions or identity theft. Examples of sensitive information may include trade secret, corporate confidential information, confidential legal documents, government protected data, etc. Examples of sensitive information may also include personal information such as health data, social security number, contact information, location information, account identifiers, rewards information, loyalty program information, etc. Sensitive information may also include cryptographic keys that can be used to decrypt encrypted information.

A "token" may be a substitute for sensitive information. A token may refer to information that can be transmitted or use in place of the sensitive information. For example, a token can be a substitute for sensitive information such as a real account identifier, and the token may be used in place of the real account identifier to conduct access the account. In the payment context, a payment token may be an identifier for a payment account and act as a substitute for the real account identifier (e.g., a primary account number (PAN)). A token may include a series of alphanumeric characters that may be used as a substitute for an original account identifier. For example, a token "4900 0000 0000 0001" may be used in place of a primary account number (PAN) "4147 0900 0000 1234." In some embodiments, a token may be format preserving and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token can be generated in a manner such that the recovery of the original sensitive information (e.g., PAN) may not be algorithmically or computationally derived. For example, a token may include random numbers so that the PAN associated with the token is not computationally derivable from the token. A lookup table may be used to associate a PAN and a corresponding token. In some embodiments, a token can be a non-payment token that is used as a substitute for other types of sensitive information.

In some embodiments, the format of the token may be include some indication that can be used by a receiving entity to identify the received information as a token. In some embodiments, the format of the token may also allow a receiving entity to identify the issuer associated with the token. For example, the format of the token may include a token issuer identifier to identify the issuer of the token. For instance, for a payment token, the token issuer identifier may be associated with an issuer's BIN of the underlying PAN in order to support the existing payment flows. The token issuer identifier may be a different number than the issuer's BIN and may be static. For example, if the issuer's BIN for an issuer is 412345, the token issuer identifier can be 528325, and this number may be static for all tokens issued from or for that issuer.

In some embodiments, tokens may be device-specific such that each communication device associated with a piece of sensitive information may be provisioned with a particular token that is different on each communication device, even though the tokens are associated with to the same underlying piece of sensitive information. As such, a piece of sensitive information may have multiple tokens associated with it. In some instances, if a token is used by a different device than the device that the token was provisioned to, usage of that token from the different device may be denied. Accordingly, device information may be stored in the token vault and used to ensure that the device using the token is associated with the token that was provisioned to the particular device. This can provide additional security because network token systems have additional information to validate in order to control the use of sensitive information in the system.

An "issuer" may typically refer to a business entity (e.g., a bank) that maintains an account (e.g., a financial account) for a user. The account can be enrolled in an application installed on a communication device of the user to allow the user to conduct transactions on the account via the communication device. A "merchant" may typically be an entity that engages in transactions and can sell goods or services, or provide access to goods or services. An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or transaction processing network (e.g., payment processing network), and for interacting with a consumer communication device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a consumer communication device. In some embodiments, where an access device may comprise a POS terminal, any suitable POS terminal may be used and may include a reader, a processor, and a computer-readable medium. A reader may include any suitable contact or contactless mode of operation. For example, exemplary readers can include radio frequency (RF) antennas, optical scanners, bar code readers, or magnetic stripe readers to interact with a consumer communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

"Provisioning" may include a process of providing data for use. For example, provisioning may include providing, delivering, or enabling a token on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device. In some embodiments, an issuer may specify a token range from which token generation and provisioning can occur. Further, in some embodiments, an issuer may generate and notify a token vault of a token value and provide the token record information (e.g., token attributes) for storage in the token vault.

"Token attributes" may include any feature or information about a token. For example, token attributes may include any information that can determine how a token can be used, delivered, issued, or otherwise how data may be manipulated within a transaction processing system. For example, token attributes may determine how a token may be used in place of a real account identifier (e.g., PAN) for a transaction. For example, the token attributes may include a type of token, frequency of use, token expiration date and/or expiration time, a number of associated tokens, a transaction life-cycle expiration date, and any additional information that may be relevant to any entity within a transaction processing system. For example, token attributes may include a wallet identifier associated with the token, an additional account alias or other user identifier (e.g., an email address, username, etc.), a device identifier, an invoice number, etc. In some embodiments, a network token system, transaction processing network associated with the network token system, an issuer, or any other entity associated with the token may determine and/or provide the token attributes associated with a particular token.

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Tokenization" is a process by which sensitive data is replaced with substitute data. For example, a real account identifier (e.g., a primary account number (PAN)) may be tokenized by replacing the real account identifier with a substitute number that may be associated with the real account identifier. Further, tokenization can be applied to any other information to substitute the underlying information with a token. "Token exchange" or "de-tokenization" is a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token requestor" may be an application, a device, or a system that is configured to perform actions associated with tokens. For example, a token requestor can perform registration with a network token system, request token generation, token activation, token de-activation, token exchange, other token life-cycle management related processes, and/or any other token related processes. A token requestor may interface with a network token system through any suitable communication networks and/or protocols (e.g., using HTTPS, simple object access protocol (SOAP) and/or an extensible markup language (XML) interface, using a secure communication channel such as secure sockets layer (SSL) or transport layer security (TLS), etc.). In some embodiments, a token requestor can be an application provider that provides a communication device with a software application that uses the token. For example, an application provider can be a third-party wallet provider that provides a digital wallet application, or an issuer, acquirer, merchant, and/or payment processing network operator that provides a payment application for a communication device. A token requestor can also be an original equipment manufacturer, a communication network operator (e.g., mobile network operator), etc. In some embodiments, a token requestor can request tokens for multiple domains and/or channels.

A "token requestor identifier" may include any characters, numerals, or other identifiers that identifies a token requestor. For example, a token requestor identifier can be generated by a network token system when the token requestor registers with the network token system. In some embodiments, a unique token requestor identifier may be assigned for each domain for a token request associated with the same token requestor. For example, a token requestor identifier can identify a pairing of the token requestor with a token domain (e.g., e-commerce, contactless, etc.). As such, in some embodiments, if a token requestor is allowed to request tokens for multiple domains, the token requestor may have multiple token requestor identifiers, one for each domain. A token requestor identifier may include any format or type of information. For example, in some embodiments, the token requestor identifier may include a numerical value such as a ten digit or an eleven digit number (e.g., 4678012345).

A "consumer" may include an individual or a user that operates a communication device to conduct a transaction on an account or otherwise manage an account. The consumer may also be referred to as a cardholder, accountholder, or user. The term "consumer" may be used interchangeably with the term "user."

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include Advance Encryption Standard (AES), Data Encryption Standard (DES), Triple Data Encryption Standard/Algorithm (TDES/TDEA), or other suitable algorithms. The key used in the cryptographic algorithm can be of any suitable lengths (e.g., 56-bit, 128-bit, 169-bit, 192-bit, 256-bit, etc.). In some embodiments, a longer key length may provide a more secure encryption that is less susceptible to hacking.

A "hardware security module" may refer to a specialized hardware component that is used to perform cryptographic operations in hardware instead of solely performing the operations in software. A hardware security module (HSM) may provide enhanced protection over software encryption technologies. For example, a HSM may provide secure key management to generate cryptographic keys, sets the capabilities and security limits of keys, implements key backup and recovery, prepares keys for storage and performs key revocation and destruction. In some embodiments, a HSM can be implemented using a cryptoprocessor, which is a processor with circuitry optimized to perform cryptographic operations. A HSM may also include a physical or logical separation between the HSM and other components of a system that communicates with the HSM. A HSM can also provide a tamper-proof mechanism that provides a high likelihood of destroying the HSM and the cryptographic keys stored therein, if any attempt is made to remove or externally access the HSM.

A "transaction processing system" may include a network of one or more devices that can process and route transaction request messages. An exemplary transaction processing system may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

FIG. 1 shows a block diagram illustrating a system 100 for securely storing sensitive information on a communication device 120, according to some embodiments. System 100 may include a communication device 120, an application provider 104, and a token server 102. Communication device 120, application provider 104, and token server 102 may communicate with each other via a secure communication protocol such as Transport Layer Security (TLS) protocol, Secure Sockets Layer (SSL) protocol, or the like.

Communication device 120 may include an application installed thereon which is provided by or otherwise associated with application provider 104. The application installed on communication device 120 can be an application that uses, accesses, and/or stores sensitive information and/or a token. For example, the application installed on communication device 120 may be a wallet application to facilitate storage and access of payment credentials to initiate transactions from communication device 120. As another example, the application installed on communication device 120 can be a health care application that is used to access or track health records of the user.

Application provider 104 can be a provider that provides a software application or services associated with the application installed on communication device 120. Application provider 104 can be a third-party software developer, an original equipment manufacturer, a communication network operator (e.g., mobile network operator), or other suitable entities that can facilitate the functionalities provided by the application installed on communication device 120. In some embodiments, application provider may perform functions such as provisioning or otherwise providing the application installed on communication device 120 with sensitive information or tokens that can be used as substitute for the sensitive information used by the application. For example, application provider 104 can be a wallet provider that facilities provisioning of payment credentials to a wallet application installed on communication device 120. In some embodiments, application provider 104 can act as a token requestor that can request tokens from token sever 102 on behalf of the user of communication device 120. Additional examples of an application provider may include issuer, payment enabler, merchant, transit authority, transaction processing network, acquirer, etc.

Token server 102 can be part of a network token system that provides sensitive information or tokens as substitutes for sensitive information. Token server 102 may issue a token in response to a request from application provider 104. Token server 102 may maintain a mapping of issued tokens to the underlying sensitive information. When an issued token is used by an application, the token can be transmitted to token server 102 to retrieve the underlying sensitive information. In some embodiments, the sensitive information or token issued by token server 102 can be encrypted by token server 102 to prevent the sensitive information or token form being stored in the clear. For example, the token issued by token server 102 in response to a token request can be encrypted with a session key generated by token server 102. The encrypted token and the session key can be provided to application provider 104, which in turns encrypt the session key before providing the session key to communication device 120. In this manner, both the token and the session key that is used to encrypt the token can be stored securely in an encrypted form on communication device 120 without having to rely on protection by a secure element. A similar security scheme can be used to store encrypted sensitive information on communication device 120.

I. Communication Device

Figure 2:
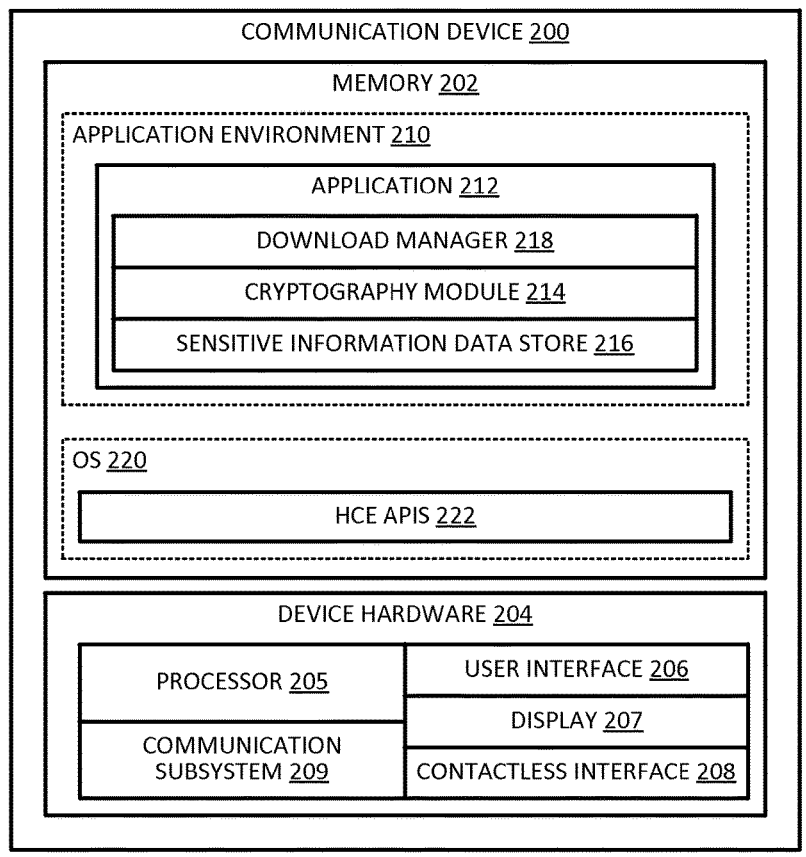
FIG. 2 illustrates a block diagram of a communication device, according to some embodiments.

FIG. 2 illustrates a block diagram of a communication device 200, according to some embodiments. Communication device 200 can be used, for example, to implement communication device 120. Communication device 200 may include device hardware 204 coupled to a memory 202. Device hardware 204 may include a processor 205, a communications subsystem 209, and a user interface 206. In some embodiments, device hardware 204 may include a display 207 (which can be part of user interface 206). Device hardware 204 may also include a contactless interface 908, for example, in some embodiments in which communication device 200 is a portable communication device. Processor 205 can be implemented as one or more integrated circuits (e.g., one or more single core or multicore microprocessors and/or microcontrollers), and is used to control the operation of communication device 200. Processor 205 can execute a variety of programs in response to program code or computer-readable code stored in memory 202, and can maintain multiple concurrently executing programs or processes. Communications subsystem 209 may include one or more RF transceivers and/or connectors that can be used by portable communication device 200 to communicate with other devices and/or to connect with external networks. User interface 206 can include any combination of input and output elements to allow a user to interact with and invoke the functionalities of communication device 200. In some embodiments, user interface 206 may include a component such as display 207 that can be used for both input and output functions.

Contactless interface 208 may include one or more specialized RF transceivers (e.g., near field communication (NFC) transceivers) to interact with a contactless reader of an access device to conduct a transaction (e.g., payment transaction, access transaction, information exchange, etc.). In secure element based implementations, only a secure element (not shown) may have access to contactless interface 208. In some embodiments, contactless interface 208 can be accessed by the mobile OS 214 using specialized card emulation APIs 216 without requiring the use of a secure element. In some embodiments, display 207 can also be part of contactless interface 208, and is used, for example, to perform transactions using QR codes, bar codes, etc.

Memory 202 can be implemented using any combination of any number of non-volatile memories (e.g., flash memory) and volatile memories (e.g., DRAM, SRAM), or any other non-transitory storage medium, or a combination thereof media. Memory 202 may store an operating system (OS) 214 and an application environment 210 where one or more applications reside including application 212 to be executed by processor 205. In some embodiments, OS 214 may implement a set of card emulation APIs 216 that can be invoked by application 212 to access contactless interface 208 to interact with an access device.

Application 212 can be an application that uses, accesses, and/or stores sensitive information or tokens. For example, application 212 can be a wallet or payment application that uses a token to conduct transactions via communication device 200. In some embodiments, access to application 212 by a user can be protected by user authentication data such as a password, passcode, PIN, etc. For example, when a user attempts to launch or execute application 212, the user may be requested to enter valid user authentication data before the user can access application 212. Application 212 may include a download manager 218, a cryptography module 214, and a sensitive information data store 216. In some embodiments, one or more of these components can be provided by another application or component that is not part of application 212.

Download manager 218 can be configured to provide functionalities to communicate with an application provider associated with application 212 to download information via the application provider. Download manager 218 may request or otherwise manage the acquisition and/or storage of sensitive information and/or tokens. For example, download manager 218 may request and obtain sensitive information or token via the application provider associated with application 212, and stored the sensitive information or token in sensitive information data store 216. In some embodiments, the sensitive information or token provided by the application provider can be received in an encrypted form. For example, the sensitive information or token can be encrypted with a session key generated by a token server. Download manager 218 may also receive, from the application provider, the session key in an encrypted form, and store the encrypted session key in sensitive information data store 216.

Cryptography module 214 may provide cryptographic functionalities for application 212. For example, cryptography module 214 may implement and perform encryption/decryption operations for application 212 using encryption algorithms such as DES, AES, TDES/TDEA, or the like, and/or hash functions such as SHA, or the like. For example, when application 212 accesses sensitive information data store 216 to retrieve and use the sensitive information or token stored therein (e.g., to conduct a transaction), application 216 may invoke cryptography module 214 to decrypt the session key that is used to encrypt the stored sensitive information or token, and then decrypt the sensitive information or token using the decrypted session key. The decrypted sensitive information or token can then be used by application 212.

II. Application Provider Computer

Figure 3:
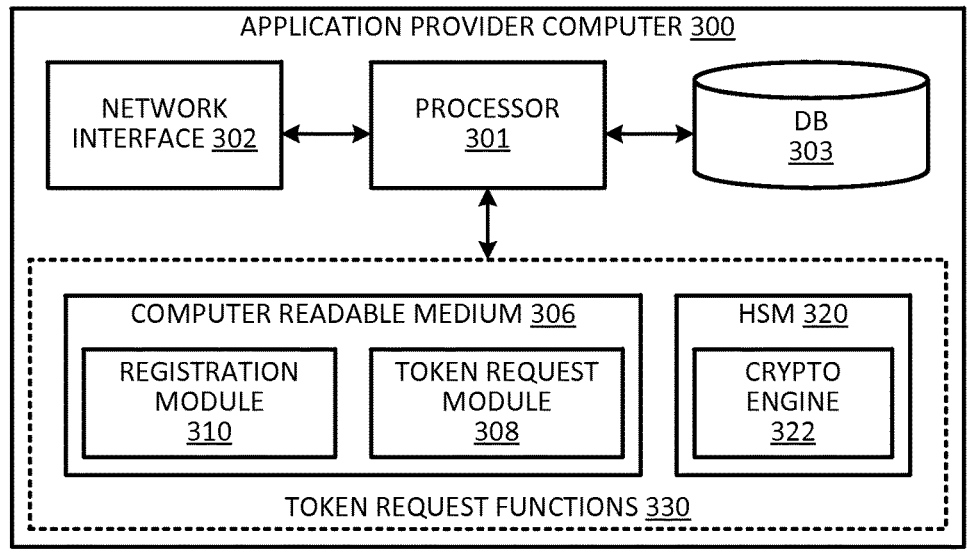
FIG. 3 illustrates a block diagram of an application provider computer, according to some embodiments.

FIG. 3 illustrates a block diagram of an application provider computer 300 associated with an application provider, according to some embodiments. For example, application provider computer 300 can be associated with and/or be operated by application provider 104 who provides a software application or services associated the application for a communication device. Application provider computer 300 may include a processor 301 coupled to a network interface 302 and a computer readable medium 306. In some embodiments, application provider computer 300 may also include a hardware security module (HSM) 320. Application provider computer 300 may also include or otherwise has access to a user database 303 that may be internal or external to application provider computer 300.

Processor 301 may include one or more microprocessors to execute program components for performing the token request functions 330 of application provider computer 300. Network interface 302 can be configured to connect to one or more communication networks to allow application provider computer 300 to communicate with other entities such as a communication device operated by a user, a token server computer, etc. Computer readable medium 306 may include any combination of one or more volatile and/or non-volatile memories, for example, RAM, DRAM, SRAM, ROM, flash, or any other suitable memory components. Computer readable medium 306 may store code executable by the processor 301 for implementing some or all of the token request functions 330 of application provider computer 300. For example, computer readable medium 306 may include code implementing a registration module 310 and a token request module 308. In some embodiments, application provider computer 300 may also include a hardware security module (HSM) 320 to implemented a cryptography engine 322.

Registration module 310 may register users with application provider computer 300. For example, a user can be registered with the application provider by providing registration module 310 with user identifying information to identify the user, device information such as a device identifier associated with the user's communication device on which an application associated with the application provider is installed, account information such as an account identifier associated with the user's account, etc. In some embodiments, a user may set up user authentication data (e.g., password, passcode, PIN, etc.) via registration module 310. The user authentication data can be used by application provider computer 300 to authenticate the user when the application on the user's communication device communicates with application provider computer 300. Registration module 310 may also allow a user to change or update the user authentication data. The registration information can be stored in a user database 303. In some embodiments, the registration process can be carried out when the user first downloads the application for installation on the user's communication device, or when the user first launches and executes the application.

Token request module 308 is configured to facilitate requests for sensitive information or tokens received from the application installed on a user's communication device. In some embodiments, upon receiving a request from the application on the user's communication device, token request module 308 may authenticate the user and/or the communication device by verifying the user authentication data and device identifier of the communication device against the previously registered information stored in user database 303. Token request module 308 may then request the sensitive information or token from a token server for use on the communication device. When token request module 308 receives the sensitive information or token from the token server, token request module 308 may send the sensitive information or token to the application executing on the communication device. In some embodiments, token request module 308 may also track which sensitive information or token is provided to a particular communication device by storing this information in user database 303. Thus, user database 303 may include a mapping between a communication device and the sensitive information or token provisioned to that communication device.

Cryptography engine 322 may provide cryptographic functionalities for application provider computer 300. In some embodiments, cryptography engine 322 can be implemented in HSM 320, which is a specialized hardware component used to perform cryptographic operations and manage cryptographic keys. Cryptography engine 322 may implement and perform encryption/decryption operations for application provider computer 300 using encryption algorithms such as such as AES, DES, TDES/TDEA, or other suitable encryption algorithms using cryptographic keys of any length (e.g., 56-bit, 128-bit, 169-bit, 192-bit, 256-bit, etc.). In some embodiments, cryptography engine 322 can also perform hash calculations using hash functions such as secure hash algorithm (SHA), or the like. For example, when application provider computer 300 receives a session key used for encrypting sensitive information or token from a token server, application provider computer 300 may invoke cryptography engine 322 to encrypt the session key, such that session key can be provided to the application on the communication device in an encrypted form. In some embodiments, the session key can be encrypted using a hash value that is computed over the user authentication data associated with the user requesting the sensitive information or token.

III. Token Server Computer

Figure 4:
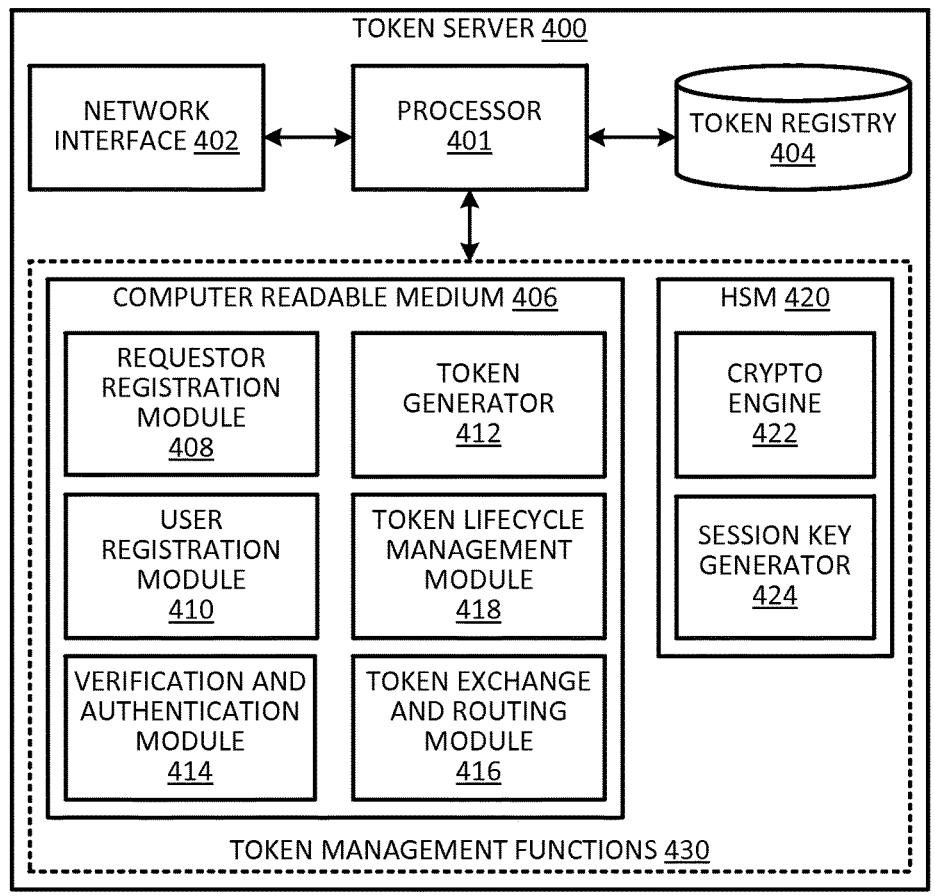
FIG. 4 illustrates a block diagram of a token server computer, according to some embodiments.

FIG. 4 illustrates a block diagram of a token server computer 400 (e.g., token server 102), according to some embodiments. In some embodiments, one or more token server computers 400 can be used, for example, to implement a network token system. Token server computer 400 may include a processor 401 coupled to a network interface 402 and a computer readable medium 406. In some embodiments, token server computer 400 may also include a hardware security module (HSM) 420. Token server computer 400 may also include a token registry 404 that may be internal or external to token server computer 400.

Processor 401 may include one or more microprocessors to execute program components for performing the token management functions 430 of token server computer 400. Network interface 402 may be configured to connect to one or more communication networks to allow token server computer 400 to communicate with other entities such as a communication device operated by a user, an application provider computer or a token request computer, merchant computer, acquirer computer, transaction processing network computer, issuer computer, etc. Computer readable medium 406 may include any combination of one or more volatile and/or non-volatile memories, for example, RAM, DRAM, SRAM, ROM, flash, or any other suitable memory components. Computer readable medium 406 may store code executable by the processor 401 for implementing some or all of the token management functions 430 of token server computer 400 described herein. For example, computer readable medium 406 may include a requestor registration module 408, a user registration module 410, a token generator 412, a verification and authentication module 414, a token exchange and routing module 416, and a token life-cycle management module 418.

Requestor registration module 408 may register a token requestor entity (e.g., application provider) with the token registry 404, and to generate a token requestor identifier (ID) for the registered entity. Each registered entity can use their respective token requestor ID as part of a token service request to facilitate identification and validation of the entity. In some embodiments, a token requestor entity may provide token requestor information to the requestor registration module 408 such as an entity name, contact information, an entity type (e.g., merchant, wallet provider, payment service provider, issuer, payment enabler, acquirer, etc.). In some embodiments in which the token is transaction related, the token requestor information may also include token presentment modes (e.g., scan, contactless, e-commerce, etc.), token type (e.g., static/dynamic, payment/non-payment), integration and connectivity parameters, and services subscribed (e.g., token request, authentication and verification, life-cycle management, etc.) and any other relevant information for the onboarding process.

User registration module 410 may perform registration of users and accounts of the users. In some embodiments, token server computer 400 may allow authorized entities to register consumer accounts (e.g., payment or financial accounts) with the network token system on behalf of the users. For example, a registered token requestor may provide a token requestor ID (e.g., received at the time of registration from the requestor registration module 408), an account identifier or other sensitive information or sensitive information identifier for which a token can substitute, a consumer name and contact information, device identifier of the consumer's communication device, a token type, and any other relevant information for individual account registration or bulk account registration. In some embodiments, user registration module 410 may store the account details and sensitive information in token registry 404 for all successful activation and registration requests. In some embodiment, an authorized entity may also unregister users and accounts by providing the necessary information to token server computer 400.

Token generation module 412 can be configured to generate a token or retrieve sensitive information in response to processing a request for a token or sensitive information from a token requestor (e.g., an application provider). In some embodiments, token generation module 412 may receive a token requestor ID and an account identifier or sensitive information identifier. In some embodiments, token generation module 412 may also receive optional information such as a user name, a user address and zip code, a requested token or sensitive information type (e.g., static, dynamic, non-payment, etc.), device identifier, and/or suitable information. In some embodiments, token generation module 412 may generate a response with the requested token or requested sensitive information, a token expiration date associated with the token, and/or a token assurance level associated with the token. In some embodiments, token generation module 412 may validate the token requestor ID and maintain the correlation between the token, the sensitive information or account identifier being substituted by the token, and the associated token requestor. In some embodiments, token generation module 412 may determine if a token already exists in token registry 404 for a token request before generating a new token. In some embodiments, if a token cannot be provisioned, the token response may include a corresponding reason code. In some embodiments, token generation module 412 may also provide an interface to the token requestors to submit a bulk token request file.

In some embodiments, the token may be generated on the fly using API calls. For example, when a request is received to tokenize an account identifier or other sensitive information, token generation module 212 may determine a token range to assign the token. The token range may be assigned based on whether the issuer is provisioning the token (e.g., issuer assigned token range) or the transaction processing network is provisioning the token on behalf of the issuer (e.g., transaction processing network assigned token range). As an example, if the transaction processing network assigned token range includes "442400000-442400250," then "4424000000005382" may be assigned as a token value. Token register 204 may store the relationship of the token range to the account identifier, and a token add record may be logged. In some embodiments, token generation module 412 may consider the token range list associated with the account identifier range before assigning a token.

Verification and authentication module 414 may be configured to execute a consumer verification and authentication process, and determine a token assurance level based on the outcome of the verification and authentication process. For example, the verification and authentication module 414 can perform consumer authentication and verification through a configured authentication scheme. In some embodiments, the authentication scheme may include verification of the account identifier, verification values, and the expiration date based on the customer information stored in a database associated with the transaction processing network. In some embodiments, the authentication scheme may include direct verification of the consumer by the issuer using consumer credentials for their online banking system.

In some embodiment, the authentication scheme may include verification of the consumer credentials through the issuer ACS (Access Control Server). For example, the issuer ACS service may be part of an authentication protocol such as 3-D secure protocol by Visa®. The ACS server may be associated with an issuer that may include registered consumer account and access information. The ACS can give issuers the ability to authenticate a consumer during an online purchase, thereby reducing the likelihood of fraudulent use of the consumer account. For example, the ACS can validate that the consumer is registered, performs consumer verification at the time of the transaction, and provides digitally signed responses to the merchants. In some embodiments, the authentication scheme may include verification of the account using a transaction processing network consumer authentication service (e.g., Visa™ Consumer Authentication Service (VCAS)). For example, the VCAS service can authenticate the consumer on-behalf of the issuer prior to the authorization process.

In some embodiments, user registration, token generation, and verification and authentication may be performed as part of processing a single token request process. In some embodiments, for bulk requests, user registration and token generation may be performed by processing a bulk file from the token requestor. In such embodiments, consumer verification and authentication may be performed in a separate step. In some embodiments, the token requestor can request that the authentication and verification process be performed independently multiple times for a particular account to reflect any changes to the levels of assurance for the token over time.

Token exchange and routing module 416 may process requests for the underlying sensitive information (e.g., an account identifier) associated with a given token. For example, transaction processing network, acquirer, issuer, etc. may issue a request for a token exchange during processing of a transaction. Token exchange and routing module 416 may validate that the requesting entity is entitled to make a request for a token exchange. In some embodiments, token exchange and routing module 416 may validate the account identifier (or other sensitive information) to token mapping and presentment mode based on the transaction timestamp and the token expiration timestamp. Token exchange and routing module 416 may retrieve the account identifier (or other sensitive information) from token registry 404, and provide it along with the assurance level to the requesting entity. In some embodiments, if the account identifier (or other sensitive information) to token mapping is not valid for the transaction timestamp and presentment mode, an error message may be provided.

Token life-cycle management module 418 may perform life-cycle operations on the tokens managed by token server computer 400. Life-cycle operations may include canceling a token, activating or deactivating a token, updating token attributes, renewing token with a new expiration date, etc. In some embodiments, a token requestor entity may provide a token requestor ID, a token number, a life-cycle operation identifier and one or more token attributes to token server computer 400 to perform the requested life-cycle operation on a given token. Token life-cycle management module 418 may verify the token requestor ID and the token association based on information in token registry 404. Token life-cycle management module 418 may perform the requested life-cycle operation on a given token, and update the corresponding associations in token registry 404. Examples of life-cycle operation may include a token activation operation to activate an inactive, suspended, or temporarily locked token and its associations; a token de-activation operation to temporarily lock or suspend a token; a cancel token operation to permanently mark a token and its associations as deleted to prevent any future transactions, etc. In some embodiments, a deleted token may be used during returns/chargebacks if the same token was used to submit the corresponding original transactions.

According to some embodiments, token server computer 400 may include a HSM 420 to perform secure functions such as encryption and decryption operations and generation of cryptographic keys used for the encryption and decryption operations. For example, HSM 420 may include a cryptography engine 422 to execute encryption algorithms such as AES, DES, TDES/TDEA, or other suitable encryption algorithms using cryptographic keys of any length (e.g., 56-bit, 128-bit, 169-bit, 192-bit, 256-bit, etc.). HSM 420 may also implement a session key generator 424 to generate a session key for each token or sensitive information request that token server computer 400 processes. The generated session key can be used to encrypt a token or sensitive information generated or retrieved for the request, and the token or sensitive information can be provided to the token requestor in an encrypted form. For example, for each request that token server computer 400 receives and processes, session key generator 424 may generate a session key that can be unique for each request received from the particular token requestor, or unique to each request associate with a particular user or account. In some embodiments, the session key can be the same or different than the encryption key that is used to establish the secure communication channel (e.g., TLS, SSL, etc.) between the token requestor and token server computer 400. Token generator 412 may generate or otherwise retrieve a token or sensitive information to fulfill the request. The session key can be used by cryptographic engine 422 to encrypt that token or sensitive information using an encryption algorithm, and the encrypted token or sensitive information can be provided to the token requestor. In some embodiments, the generated session key is also provided to the token requestor with the encrypted token or sensitive information.

Although token server computer 400 and application provider computer 300 has been described with a HSM implementing only some of their functions, it should be understood that other functionalities of the respective computers (e.g., token generation) can be implemented inside a HSM as well. Furthermore, some or all of the respective HSM functionalities can also be implemented outside of a HSM.

IV. Example Processes

Figure 5:
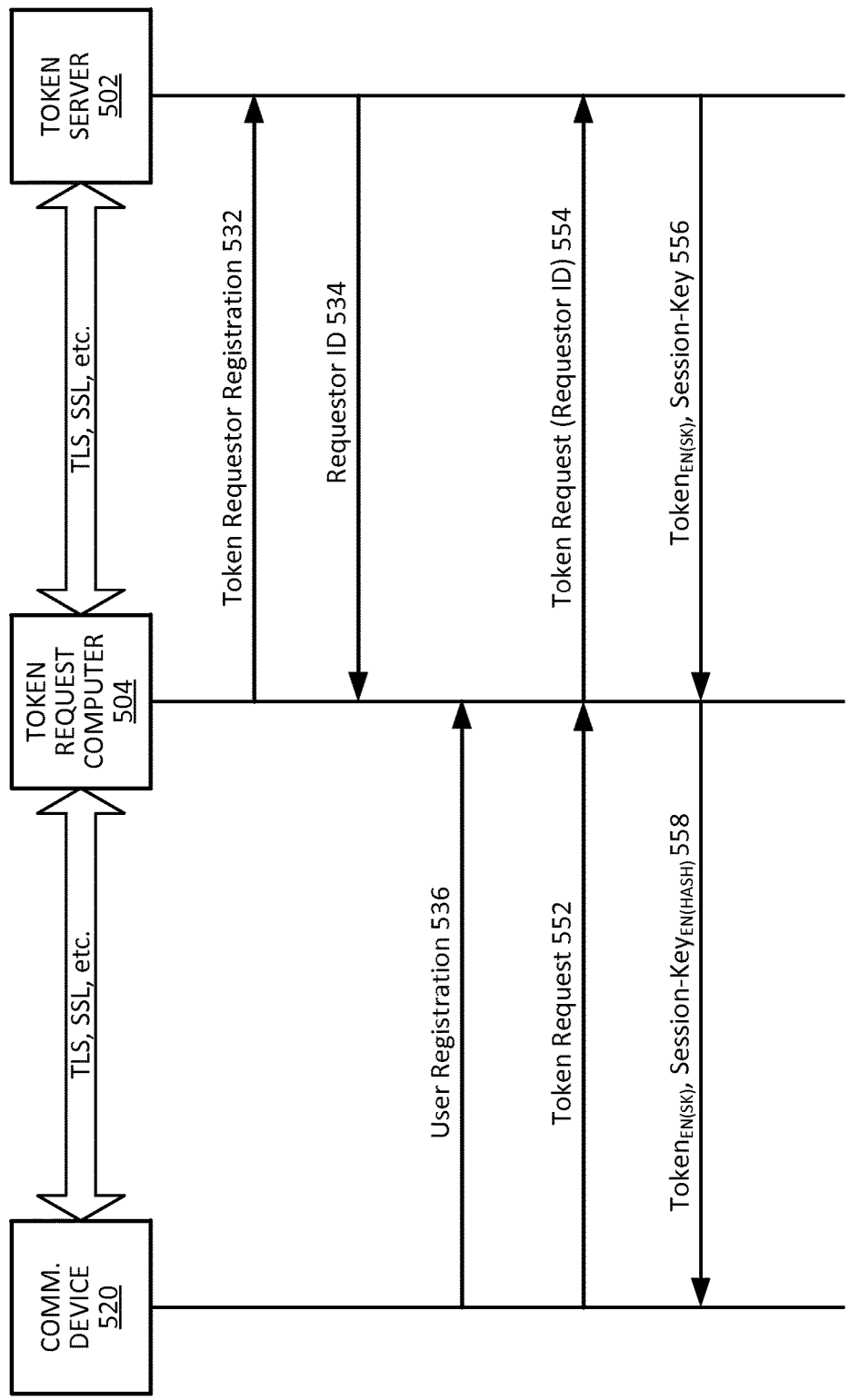
FIG. 5 illustrates a communication flow diagram for processing a request for a token or sensitive information, according to some embodiments.

FIG. 5 illustrates a communication flow diagram for processing a request for a token or sensitive information, according to some embodiments. In FIG. 5, token request computer 504 is used to facilitate the processing of the request from an application executing on communication device 520. Token request computer 504 can be, for example, an application provider computer, and can be associated with or operated by a token requestor such as the application provider of the application on communication device 520. Communication device 520 may communicate with token request computer 504 over a secure channel according to a secure protocol such as TLS, SSL, or other suitable secure communication protocols. Token request computer 504 may also communicate with token server 502 over a secure channel according to a secure protocol such as TLS, SSL, or other suitable secure communication protocols.

Prior to processing the request, token request computer 504 can be registered with a token server 502 by sending a token requestor registration 532 to token server 502. Token requestor registration 532 may include token requestor information that can be used to verify that the token requestor is an authorized entity to request tokens or sensitive information on behalf of the user of communication device 520. Upon verifying that the token requestor associated with token request computer 504 is an authorized entity, token sever 502 may send a requestor ID 534 to token request computer 504. Requestor ID 534 can be an identifier that token server 502 uses to uniquely identify the token requestor.

Communication device 520 may also send a user registration 536 to token request computer 504. User registration 536 may include identification information about the user of communication device 520 and/or account information such as an account identifier (e.g., PAN) associated with an account of the user. In some embodiments, the user of communication device 520 can also register user authentication data (e.g., password, passcode, PIN) that can be used by token requester computer 504 to subsequently authenticate the user of communication device 520 when requesting a token or sensitive information. In some embodiments, user registration 536 can be performed when the application is downloaded and installed on communication device 520, the first time the application is launched or executed, or as part of the first time that the application sends a request for a token or sensitive information.

To request a token or sensitive information, a user may launch the corresponding application installed communication device 520. The application may request the user to enter user authentication data that was previously registered with token request computer 504. Communication device 520 may then send a token request 552 to token request computer 504. Token request 552 may include the user authentication data received by the application as well as information about the nature of the token or sensitive information being requested. For example, token request 552 may include an account identifier or other sensitive information for which the requested token is to substitute, or an identifier for the sensitive information being requested. In some embodiments, this information can be omitted in token request 552, and token request computer 504 may look up this information based on the user information previously registered with token request computer 504. For example, instead of providing an account identifier in token request 552, token request computer 504 may look up a previously registered account identifier associated with the user in the user database of token request computer 504.

In response to receiving token request 552, token request computer 504 may authenticate the user based on the user authentication data, and forward the request as token request 554 to token server 502. In addition to the information received in token request 552, token request 554 may also include the requestor ID of the token requestor. As mentioned above, if token request 552 did not include an account identifier or an identifier for the sensitive information, token request computer 504 may look up this information and include the retrieved information in token request 554.

When token server 502 receives token request 554, token server 502 may verify that the token requestor is an authorized entity based on the received token requestor ID. In some embodiments, token server 502 may generate a session key (e.g., a symmetric key) for the request. For example, the session key can be a 256-bit key, or other suitable length key. Token server 502 may then generate or otherwise retrieve the requested token and encrypt the token using the generated session key. For example, token server 502 may encrypt the token using an AES-256 algorithm or other suitable encryption algorithm. In some embodiments in which the request is for sensitive information, token server 502 may retrieve the sensitive information and encrypt the sensitive information using the session key.

Token server 502 may then send a response 556 including the encrypted token or encrypted sensitive information and the generated session key to token request computer 504. In response to receiving response 556, token request computer may encrypt the received session key using a hash value as an encryption key. In some embodiments, the hash value can be computed over the user authentication data. For example, a 256-bit hash value can be computed over the user authentication data using a SHA-256 or other suitable hash functions. Token request computer 504 may then send the encrypted token or sensitive information with the encrypted session key to communication device 520 in response 558.

The application on communication device 520 requesting the token or sensitive information may then store the encrypted token or sensitive information and the encrypted session key on communication device 520 for subsequent use. Because the token or sensitive information is encrypted, they can be stored on communication device 520 without relying on the security protection of a secure element. In some embodiments, if communication device 520 is power-cycled or rebooted, the encrypted token or sensitive information and/or the encrypted session key can be removed or deleted from communication device 520. For example, in some embodiments, the encrypted token or sensitive information and/or the encrypted session key can be stored in a volatile memory of communication device 520 such that the encrypted token or sensitive information and/or the encrypted session key are automatically wiped from the memory when power to communication device 520 is interrupted. Upon power-up, the application can send a new request for the sensitive information or a new token.

Figure 6:
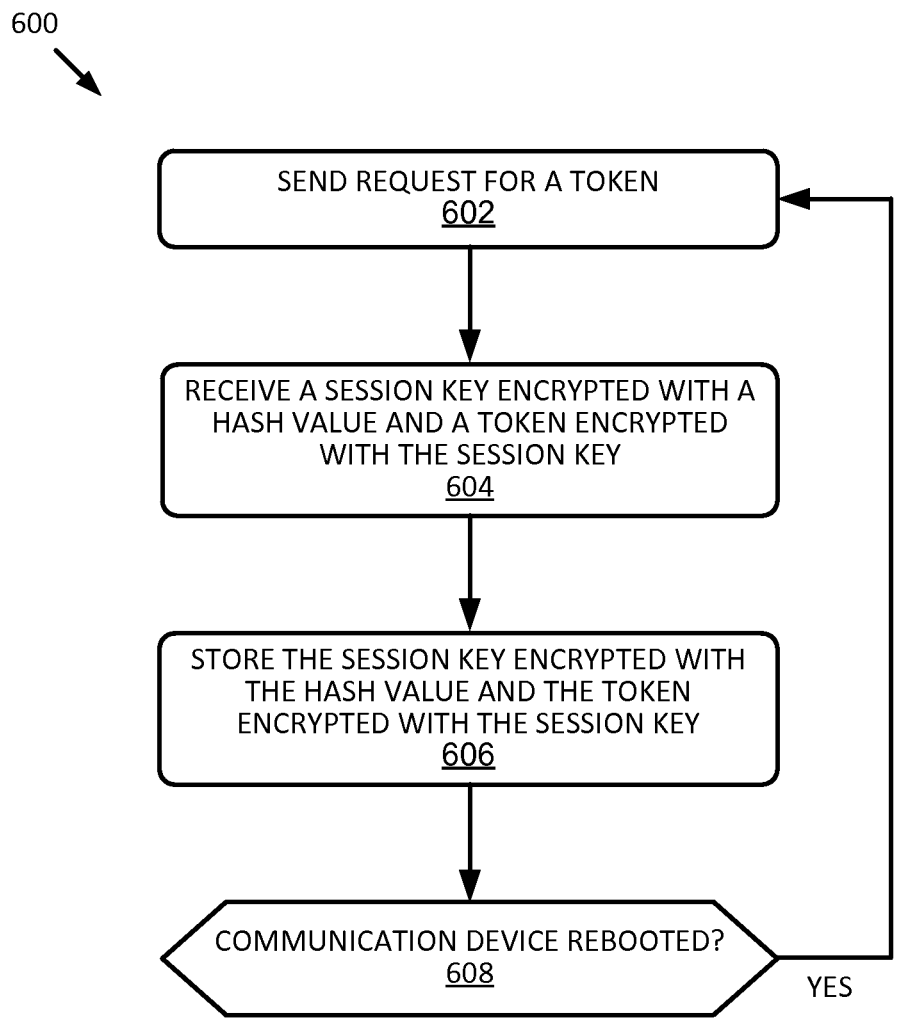
FIG. 6 illustrates a flow diagram of a process to enhance the security of storing a token or sensitive information on a communication device, according to some embodiments.

FIG. 6 illustrates a flow diagram of a process 600 that can be performed by a communication device to enhance the security of storing a token or sensitive information on the communication device, according to some embodiments. At block 602, process 600 may send a request for a token or sensitive information to a token request computer. In some embodiments, the token being requested can be a substitute for an account identifier associated with an account of the user. At block 604, the communication device may receive a session key encrypted with a hash value derived from user authentication data that authenticates a user of the communication device to an application running on the communication device, and a token or sensitive information encrypted with the session key from the token requester computer. The session key can be generated, for example, by a token server in response to the token server processing the request for the token or sensitive information.

At block 606, process 600 may store the session key encrypted with the hash value, and the token or sensitive information encrypted with the session key in a memory of the communication device for subsequent use. In some embodiments, the memory of the communication device storing the encrypted token or sensitive information and/or the encrypted session key can be a memory that is not part of a secure element. In some embodiments, the memory can be a volatile memory that is automatically erased when power to the communication device is turned off. At block 608, process 600 determines if the communication device has rebooted (e.g., power-cycled, restarted, etc.) subsequent to storing the encrypted token or sensitive information and/or the encrypted session key. If process 600 determines that the communication device has rebooted, process 600 may repeat, and a new request for sensitive information or a new token can be sent to the token request computer. In some embodiments, the encryption/decryption operations in process 600 can be performed using a AES-256 or other suitable cryptographic algorithms, and the hash value can be computed using SHA-256 or other suitable hash functions.

Figure 7:
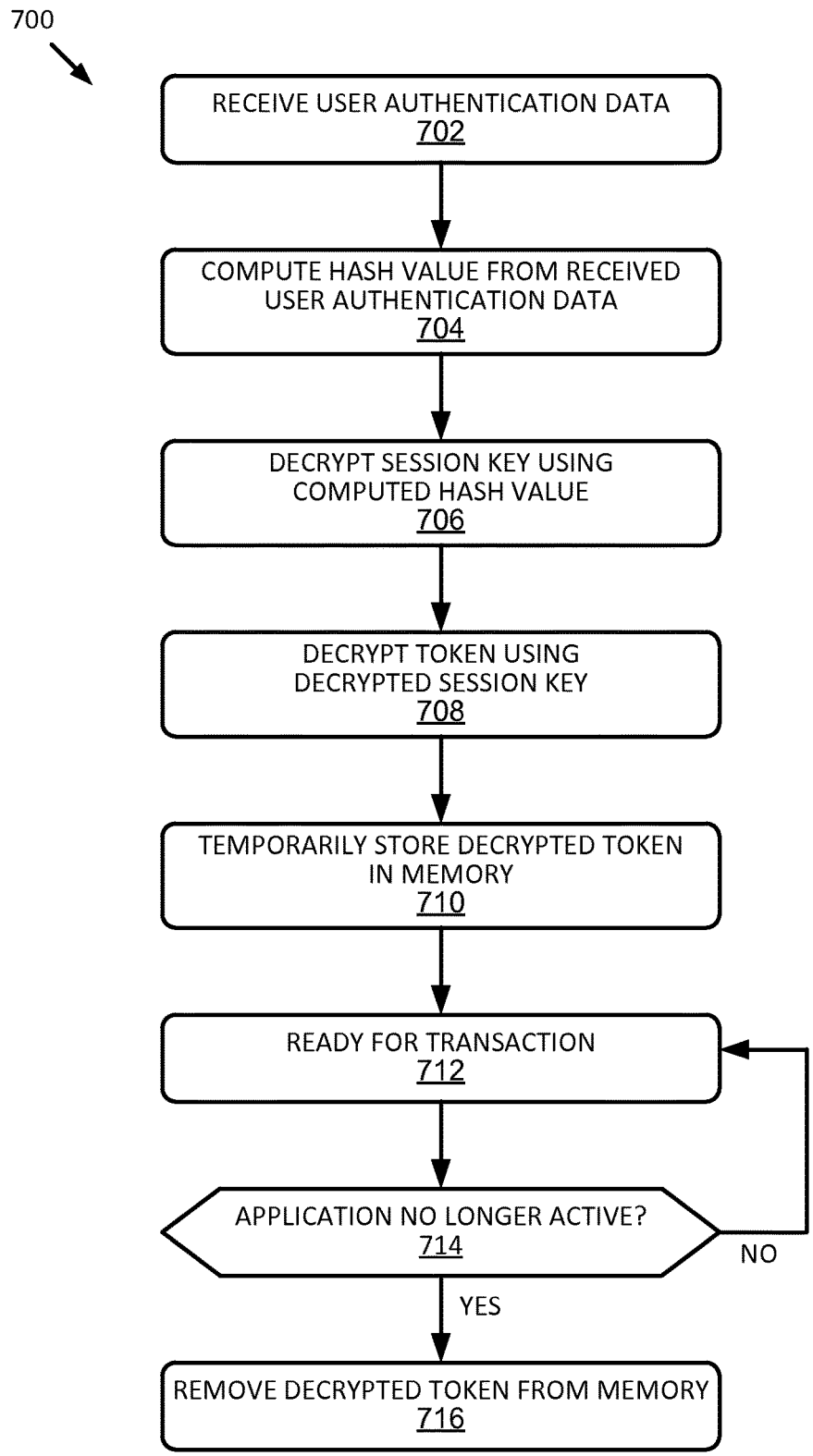
FIG. 7 illustrates a flow diagram of a process to use a token or sensitive information, according to some embodiments.

FIG. 7 illustrates a flow diagram of a process 700 that can be performed by a communication device to use a token or sensitive information, according to some embodiments. A user may interact with a user interface of the communication device to execute or access an application installed on the communication device. The application may request the user to enter user authentication data on a user interface. At block 702, process 700 may receive the user authentication data from the user on a user interface of the communication device. The application may authenticate the user based on the received user authentication data, and retrieve an encrypted token or sensitive information, and an encrypted session key from memory for use by the application.

At block 704, a hash value can be computed from the received user authentication data. At block 706, the computed hash value can be used to decrypt the session key retrieved from memory. Once the decrypted session key is obtained, at block 708, the decrypted session key can be used to decrypt the token or sensitive information retrieved from memory. At block 710, the decrypted token or sensitive information can be temporarily stored on the communication device to allow the application to use this information. For example, in some embodiments, the token may be a substitute for an account identifier, and the communication device can be set in a state that is ready to perform a transaction at block 712 after obtaining the decrypted information. The communication device can then initiate a transaction using the token instead of an account identifier via the application.

At block 714, process 700 determines if the application is no longer active on the communication device. For example, the application can be detected as being no longer active when the user logs off the application, the application is suspended into a background operating environment of the communication device, or the application is closed or exited. Upon detecting that the application is no longer active, the decrypted token or sensitive information can be removed from the memory of the communication device to prevent static storage of the decrypted information. If it is determined that the application is still active, the application can remain in the ready for transaction state. In some embodiments, the encryption/decryption operations in process 700 can be performed using a AES-256 or other suitable cryptographic algorithms, and the hash value can be computed using SHA-256 or other suitable hash functions.

V. Transaction Processing System

Figure 8:
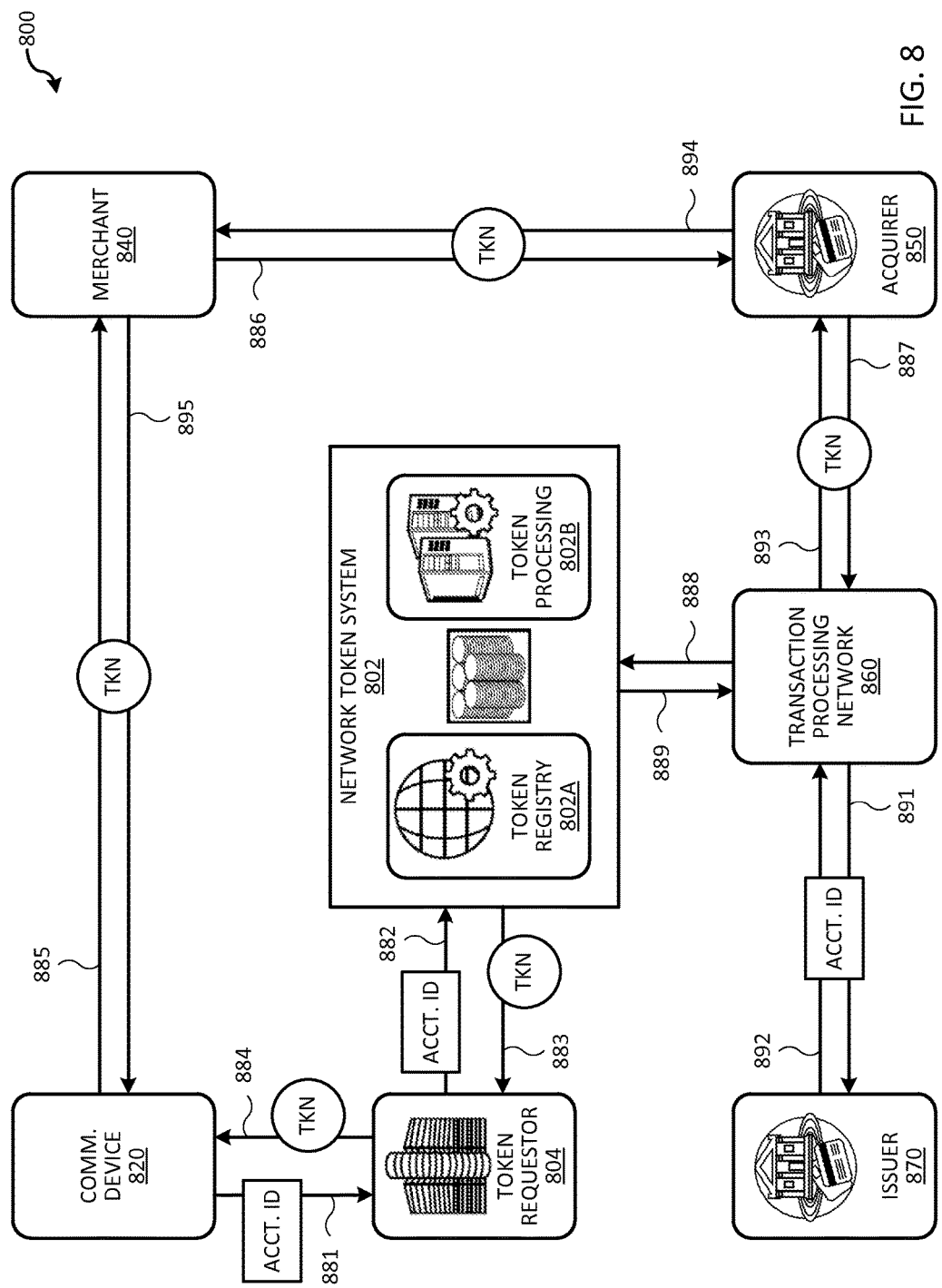
FIG. 8 illustrates a block diagram of transaction processing system, according to some embodiments.

FIG. 8 illustrates a transaction processing system 800 utilizing a network token system, according to some embodiments. System 800 may include a communication device 820 operated by a consumer, a merchant 840, an acquirer 850, a transaction processing network 860, an issuer 870, a token requestor 804, and a network token system 802 (may also be referred to as a token server). In some implementations, the entities in FIG. 8 may communicate with each other using one or more communication networks such as the Internet, a cellular network, a TCP/IP network or any other suitable communication network. One or more entities in the system 800 may be associated with a computer apparatus that may include a processor and a memory implementing code to perform the functions associated with the entity. In some embodiments, one or more entities in the system 800 may be associated with a computer apparatus equipped with specialized hardware such as a hardware security module to perform secure functions such as cryptographic key generation and encryption/decryption operations.

Communication device 820 can be operated by a consumer to initiate a transaction with a merchant by interacting with an access device (not shown) such as a point-of-sale (POS) terminal associate with the merchant. Communication device 820 may be associated with one or more accounts of the consumer such that the consumer can perform transactions on the one or more accounts via communication device 820. In some implementations, communication device 820 may be a computer or a portable communication device such as a mobile device (e.g., mobile phone, a tablet, a PDA, a notebook, a key fob or any suitable mobile device), or any of the examples of a communication device described herein. Communication device 820 may include an application (e.g., a transaction application such as a digital wallet application or a payment application) installed thereon that is used to conduct transactions on one or more accounts of the consumer. The application may provide transaction functionalities (e.g., payment functionalities) and account management functionalities. In some implementations, communication device 820 may be capable of communicating with an access device using a short range communication technology such as NFC. For example, the user may interact with the access device by tapping or waving communication device 820 in proximity of the access device.

An access device (not shown) may be an access point to a transaction processing system to facilitate processing of a transaction. In some implementations, an access device may be associated with or operated by merchant 840. For example, the access device may be a point of sale terminal that may include a contactless reader, an electronic cash register, a display device, etc. In some implementations, the access device may be configured to display transaction information in a format that may be read by communication device 820 (e.g., mobile phone) including a QR code, bar code, or any other information transfer mechanism. In some implementations, communication device 820 may act as an access device (e.g., a computer) that may be used by the consumer to initiate a transaction with merchant 840 (e.g., an online transaction).

Transaction processing network 860 is a system that can provide authorization services, and clearing and settlement services for transactions. Transaction processing network 860 can be a payment processing network that processes payment transactions, and may include data processing subsystems and utilize wired or wireless networks including the Internet. An example of a transaction processing network 860 may include VisaNet™, operated by Visa®. Transaction processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Transaction processing network 860 may include one or more server computers. In some implementations, transaction processing network 860 may forward an authorization request received from acquirer 850 to issuer 870 via a communication channel. Transaction processing network 860 may further forward an authorization response message received from the issuer 870 to the acquirer 850.

A token requestor 804 may be an entity that can request a token from the network token system 802 on behalf of a consumer. For example, token requestor 804 can be an application provider (e.g., a digital wallet application provider, a payment application provider) associated with a transaction application installed on communication device 820. In some embodiment, the application provider may be a third-party wallet provider, issuer, acquirer, merchant, payment processing network operator, original equipment manufacturer, communication network operator (e.g., mobile network operator), or other suitable entities that may use a token or store a token on behalf of a consumer. Token requestor 804 may interact with network token system 802 using a token requestor interface for the generation, usage, and management of tokens.

In some embodiments, each token requestor may have to undergo an onboarding or registration process to ensure that the token requestor meets integration and security standards in order to use the tokenization services provided by network token system 802. For example, network token system 802 may provide services such as account registration, token generation, token issuance, token authentication and activation, token exchange, and token life-cycle management to the registered entities. As part of the onboarding process, token requestor 804 may register with the network token system 802, and may receive a token requestor identifier (ID) provided by network token system 802. Token requestor 804 may specify configuration preferences or token attributes associated with tokens requested by the token requestor including, for example, the type of token, supported token presentment modes (e.g., scan, contactless, e-commerce, etc.) and any other relevant token configuration information during the onboarding process. Further, token requestor 804 may limit the use of requested tokens to certain channels (e.g., contactless, etc.).

Token requestor 804 may be configured to request a new token or request life-cycle management actions for an existing token (e.g., change an existing token, deactivate a token, etc.). In some embodiments, token requestor 804 may provide an account identifier (e.g., a PAN) and an expiration date with a request for a new token. Network token system 802 may use the token requestor ID to identify and validate token requestor 804 as well as validate a token based transaction when processing a transaction conducted with a token.

Network token system 802 may include a token registry database 802A (may also be referred to as token registry or token vault) and a token processing computer 802B. Token registry database 802A may store and maintain issued or generated tokens as well as any other relevant information to the tokens. For example, a token registry entry may include a token requestor ID and an account identifier (e.g., PAN) for each token issued by network token system 802. Token registry database 802A and the token processing computer 802B may be configured to provide services associated with the token registry including, for example, account registration, token generation, token issuance, token authentication and activation, token exchange, token routing, token assurance level generation, token life-cycle management, and token processing to the entities that are registered with network token system 802.

Tokens in token registry database 802A may include different token states that may determine whether a token can be used in a transaction as well as the actions necessary to allow a token to be used in a transaction. For example, token states may include active, inactive, suspended, on hold, deactivated, or any other indication of the availability for a token to be used in a transaction. For instance, in some embodiments, a token may be generated by the token vault and may be immediately active and available for transacting. Further, issuers may notify the transaction processing network 860 or the token processing computer 802B of tokens that are "inactive" or not currently in use. A token may be changed to "suspended" which is a temporary state in which no authorizations or transactions can be performed with the token. A "deactivated" state may mean that the token is permanently suspended and no further authorizations or transactions can be performed with the token. In some embodiments, tokens may reflect certain attributes relevant to the account identifier (e.g., PAN) being tokenized. For example, in some embodiments, the token may reflect funding source and the country associated with the underlying account identifier.

In some embodiments, merchant 840 and acquirer 850 may be provided with a token instead of an account identifier (e.g., PAN) to conduct a transaction. For example, merchant 840 and/or acquirer 850 may receive a token in the traditional PAN field of authorization request message and may forward the authorization request message to transaction processing network 860 for processing. Transaction processing network 860 may replace the token with the real account identifier (e.g., PAN), and send a modified authorization request message to issuer 870. In some embodiments, the authorization request message may further have the token moved to a new field in the authorization message and/or clearing message for issuer 870 to receive, so that the issuer may receive both the account identifier (e.g., PAN) and the token in such messages.

In some embodiments, a token requestor interface may be used by the token requestor 804 to interact with network token system 802. For example, token requestor 804 may send requests for multiple actions including token issuance, token life-cycle management (e.g., activation, deactivation, account credential update, etc.), and token authentication. In some embodiments, the token requestor interface may include an application programming interface (API) or any other relevant messaging formats may be used. For example, token requestor 804 may send a request for a token (may be referred to as a token issuance request) that includes account information (e.g., a PAN and any other account details) and a token requestor ID. Additionally, in some embodiments, token requestor 804 may provide a bulk token request file that includes a plurality of account identifiers (e.g., PANs) and a token requestor ID, and network token system 802 may generate and return a plurality of tokens, where each token is associated with an account identifier (e.g., PAN) from the bulk file request. In some embodiments, token requestor 804 may optionally provide one or more token attributes with the request such as, for example, a frequency of use (e.g., single-use or multi-use), a type of token (e.g., payment or non-payment), a token expiration date and/or time, a number of requested tokens, a transaction life-cycle expiration date, etc. In some embodiments, the token request may further include one or more of an MSISDN (Mobile Subscriber Integrated Services Digital Network-Number), an account nickname (e.g., an alias), a UUID (Universally Unique Identifier) associated with the account or consumer, an IMEI (International Mobile Station Equipment Identity), an IMSI (International Mobile Subscriber Identity), an application identifier, etc.

Further, token requestor 804 may request that the network token system 802 add a token to the account identifier (e.g., PAN) relationship in the token registry database 802A. Token requestor 804 may also request the network token system 802 to change the attributes for a token associated with the account identifier (e.g., PAN) relationship in the token registry database 802A. For example, token requestor 804 may request that the network token system 802 suspend a token due to the loss of a device by the user. Token requestor 804 may request that the network token system 802 deactivate a token in the token registry database 802A. In some embodiments, the corresponding record in the token registry database 802A may be marked deactivated (e.g., no longer valid for new transactions), but may remain available for exception processing for a limited period of time and may then be subsequently removed. In some embodiments, network token system 802 may purge the tokens that have expired or that have been deactivated for a period of time on a periodic basis. Token requestors may also create batch files of token requests (e.g., add, delete or deactivate) and send them to network token system 802 on a periodic basis.

Having described the various entities in system 800, an example transaction flow using a token will now be described. In step 881, the user of communication device 820 may provide an account identifier (e.g., primary account number (PAN)) to token requestor 804 to request a token that can be used for one or more transactions. For example, the user may access an application installed on communication device 820 to interact with token requestor 804. In some embodiments, the user may participate in a consumer authentication and verification process with token requestor 804, network token system 802, or issuer 870 using one or more authentication schemes to utilize the network token services.

In step 882, token requestor 804 communicates with network token system 802 to request a token associated with the account identifier. Token requestor 804 can send a token request message to network token system 802 for a token using a token requestor interface. In some embodiments, the token request message may include a token requestor ID, an account identifier (e.g., PAN), an expiration date, a card verification value (e.g., CVV2) associated with the account identifier, and any other relevant information used by network token system 802 to provide a token.

In step 883, network token system 802 may generate and/or determine a token to fulfill the token request, and provide the token to token requestor 804 in response to the token request. For example, network token system 802 may provide a token value (e.g., token number), a token expiration date, and a token assurance level associated with the token to token requestor 804. In some embodiments, network token system 802 may generate the token value based on the real issuer identifier (e.g., Bank Identification Number (BIN)) of the issuer of the account identifier (e.g., PAN) provided in the token request. Accordingly, the token may be generated using a token BIN range associated with the real account issuer associated with the account in which a token is being requested.

The token value may be generated using any suitable method once a token BIN is designated, including choosing the next available sequential available token, randomly generating available tokens within the token BIN range, or any other suitable method. Once the token is generated or determined, a token record/entry for the token may be generated in the token vault. Any processes or methods may be performed to obtain the relevant data to populate the token record data including obtaining data from a transaction processing network or issuer associated with the account identifier, authenticating a consumer to determine the token assurance data associated with the request, and any other relevant processes for obtaining the relevant information.

Additionally, a token provisioning notification may be generated and sent to issuer 870 that may notify issuer 870 that one of their account holders has provisioned a token using the network token system 802. The token provisioning notification message may include a message reason code that may contain any of the following information regarding the token provisioning including token create, token deactivate, token suspend, token resume, etc. Additionally, a token number, token assurance level, and token requestor ID may be provided to issuer 870.

In step 884, token requestor 804 may provide the token to communication device 820. In some embodiments, token requestor 804 may also provide a token requestor ID and a token assurance level code associated with the token to communication device 820, and may provision the token requestor ID and token assurance level code with the token in communication device 820. Accordingly, when the user initiates a transaction with communication device 820, the token requestor ID and token assurance level code may be included in the authorization request message.

In step 885, communication device 820 may interact with merchant 840 to initiate a transaction and to provide merchant 840 with the token to conduct the transaction. For example, the user may wave communication device 820 in the vicinity of a contactless reader of an access device associated with merchant 840 to transfer the token to merchant 840. Alternatively, a consumer may tap or otherwise make contact with an access device to pass the token and other transaction information to initiate a transaction.

In step 886, merchant 840 may generate an authorization request message including the token, and send the authorization request message to acquirer 850 to request authorization for the transaction initiated by the user. For example, the authorization request message may include the token based values such as a token value, a presentment mode, a token requestor ID, and an assurance level code associated with the token. Depending on the type of transaction, the various token based information in the authorization request message may be provided through any number of different entities and through a various number of processes.

In step 887, acquirer 850 may forward the authorization request message including the token to the transaction processing network 860. The transaction processing network 860 receiving the authorization request message may determine that the authorization request message includes a token, and may provide the token to network token system 802 in step 888 to retrieve a real account identifier (e.g., a PAN) for the transaction. In some embodiments, transaction processing network 860 may send the authorization request message to network token system 802 for validation of the transaction attributes associated with the token received in the authorization request message. In some embodiments, transaction processing network 860 may send a request for the token attributes to network token system 802, and network token system 802 may respond with the token attributes that are associated with the token including the real account identifier (e.g., PAN) but also the channel limitations, merchant limitations, etc. In some embodiments, transaction processing network 860 may parse the relevant information for validation by network token system 802, and may provide the relevant information (e.g., token, token presentment mode, merchant information (e.g., merchant category code), token requestor identifier, etc.) for the transaction but may not forward the authorization request message to network token system 802.

In step 889, token processing computer 802B of network token system 802 may receive the token, search token registry 802A for the token record associated with the received token, determine an account identifier (e.g., PAN) associated with the token and any limitations and/or validation information associated with the token, and may provide the account identifier (and any other relevant validation information) to transaction processing network 860 for processing of the transaction. Alternatively or additionally, token processing computer 802B may validate if the token/account identifier mapping is valid, and/or if the transaction should be allowed for the token based on the transaction timestamp, token expiration date, token presentment mode, token requestor ID, and any other relevant information. If an account identifier cannot be located or validated for the token, then the transaction may be declined. If the transaction information is validated with the limitations associated with the token in the token registry, the account identifier (e.g., PAN) may be returned to transaction processing network 860. Depending on whether transaction processing network 860 or network token system 820 processes the limitations and validates the transaction for the token related information, validation information may be sent in the response along with the account identifier (e.g., PAN) for including in an authorization request message. Further, in some embodiments, token processing computer 802B of the network token system 802 may be configured to perform all of the processes associated with the transaction processing network 860 (or vice versa), and thus the functionalities of transaction processing network 860 and network token system 802 can be performed by a single entity.

In step 891, transaction processing network 860 may modify the authorization request message to include the account identifier associated with the token (e.g., replace the token with the account identified in the authorization request message), and provide the modified authorization request message to issuer 870. Transaction processing network 860 may also perform other validation, authentication, authorization, and/or other relevant processes before modifying and sending the modified authorization request message. In some embodiments, the authorization request message sent to issuer 870 may also include the token or an indication that the transaction involved a token, depending on the configuration settings of the issuer. A token assurance level code may also be provided in the modified authorization request message to provide the issuer additional information regarding the risk of the transaction and the confidence that network token system 802, token requestor 804, communication device 820, and/or the user that requested the token was in fact the accountholder or an authorized agent of the accountholder.

In step 892, issuer 870 receives the authorization request message, makes an authorization decision regarding whether the transaction should be approved or declined, and provides an authorization response message including an indication as to whether the transaction is approved or declined to transaction processing network 860. Issuer 870 may perform any number of processes to determine whether the transaction should be approved or declined. For example, issuer 870 may determine if the transaction can be authorized based on the consumer account information (e.g., available balance, transaction history, etc.).

In step 893, transaction processing network 860 may receive the authorization response message from issuer 870, and modify the authorization response message received from issuer computer 870 to replace the account identifier with the token. In some embodiments, transaction processing network 860 may interact with network token system 802 to look up the account identifier to token mapping to obtain the token associated with the account identifier. In some embodiments, transaction processing network 860 may temporarily store the account identifier to token mapping for the transaction, and may use the temporarily stored token to populate the token information in the authorization response message. Further, in some embodiments, the token may be provided in the modified authorization request message and thus, the token may be returned along with the account identifier (e.g., PAN) in the authorization response message, and thus, may be parsed from the authorization response message. Transaction processing network 860 may log the decision of the issuer along with the token for the subsequent clearing and settlement processes.

In step 893, transaction processing network 860 may modify the authorization response message to remove the account identifier (if present), and send the modified authorization response message including the token to acquirer 850. In some embodiments, transaction processing network 860 may optionally provide the last four digits of the real account identifier (e.g., PAN) to the acquirer 850 in the modified authorization response message for printing on the receipt or otherwise confirming with the consumer that the correct account was charged or used for the transaction. In step 894, acquirer 850 may forward the modified authorization response message to merchant 840. In step 895, merchant 840 may indicate the authorization response to communication device 820. For example, merchant computer 840 may send a message to the communication device 820 indicating if the transaction is approved or declined.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A communication device comprising:
a processor; and
a non-transitory computer readable medium coupled to the processor and implementing an application that performs operations for enhancing security of storing a token on the communication device, the operations including:
sending, to a token request computer, a request for the token, wherein the token is a substitute for an account identifier associated with an account of the user, and the account identifier is not computationally derivable from the token;
receiving from the token requester computer:
a session key encrypted with a hash value derived from user authentication data that authenticates a user of the communication device; and
the token encrypted with the session key;
storing the session key encrypted with the hash value and the token encrypted with the session key in a memory of the communication device, wherein the encrypted session key and the encrypted token are automatically deleted from the communication device when power to the communication device is interrupted; and
subsequent to storing the encrypted session key and the encrypted token on the communication device:
receiving user authentication data on a user interface of the communication device to initiate a transaction via the application;
computing the hash value from the received user authentication data;
decrypting the encrypted session key using the hash value;
decrypting the encrypted token using the decrypted session key;

temporarily storing the decrypted token on the communication device;
initiating the transaction using the decrypted token instead of the account identifier; and
removing the decrypted token from the communication device, wherein the decrypted token is removed from the communication device upon detecting that the application is no longer active.

2. The communication device of claim 1, wherein the application is detected as being no longer active when:
the user logs off the application;
the application is suspended into a background operating environment of the communication device; or
the application is closed or exited.

3. The communication device of claim 1, wherein the session key is generated and provided to the token request computer by a token server in response to the token server processing the request for the token.

4. The communication device of claim 3, wherein the token server maintains a mapping of the account identifier to the token.

5. The communication device of claim 1, wherein the operations further include:
detecting that the communication device has rebooted; and
sending, to the token request computer, a new request for a new token.

6. The communication device of claim 1, wherein the token is a format preserving token that has the same format as the account identifier.

7. A method for enhancing security of storing a token on a communication device comprising:
receiving, by a token request computer, a request for a token from the communication device, wherein the token is a substitute for an account identifier associated with an account of a user, and the account identifier is not computationally derivable from the token;
sending, by the token request computer, the request to a token server;
receiving, from the token server, a session key associated with the request, and the token encrypted with the session key;
encrypting the session key with a hash value derived from user authentication data for authenticating a user of the communication device; and
sending the session key encrypted with the hash value, and the token encrypted with the session key to the communication device,
wherein the session key encrypted with the hash value and the token encrypted with the session key are stored in a memory of the communication device, wherein the encrypted session key and the encrypted token are automatically deleted from the communication device when power to the communication device is interrupted, and
wherein subsequent to storing the encrypted session key and the encrypted token on the communication device, the communication device receives user authentication data on a user interface of the communication device to initiate a transaction, computes the hash value from the received user authentication data, decrypts the encrypted session key using the hash value, decrypts the encrypted token using the decrypted session key, temporarily stores the decrypted token on the communication device, initiates the transaction using the decrypted token instead of the account identifier, and removes the decrypted token from the communication device upon detecting that the application is no longer active.

8. The method of claim 7, further comprises:
sending an account identifier of an account associated with the user of the communication device and a token requestor identifier associated with the token request computer to the token server.

9. The method of claim 7, wherein the token server maintains a mapping of the account identifier to the token.

10. The method of claim 7, wherein the token is associated with a token expiration date and a token assurance level.

11. The method of claim 7, wherein the token is a format preserving token that has the same format as the account identifier.

12. A method for enhancing security of storing a token on a communication device, the method comprising:
sending, to a token request computer, a request for the token, wherein the token is a substitute for an account identifier associated with an account of a user, and the account identifier is not computationally derivable from the token;
receiving from the token requester computer:
a session key encrypted with a hash value derived from user authentication data for authenticating the user of the communication device; and
the token encrypted with the session key; and
storing the session key encrypted with the hash value and the token encrypted with the session key in a memory of the communication device, wherein the encrypted session key and the encrypted token are automatically deleted from the communication device when power to the communication device is interrupted;
subsequent to storing the encrypted session key and the encrypted token on the communication device:
receiving user authentication data on a user interface of the communication device to initiate a transaction via the application;
computing the hash value from the received user authentication data;
decrypting the encrypted session key using the hash value;
decrypting the encrypted token using the decrypted session key;
temporarily storing the decrypted token on the communication device;
initiating the transaction using the decrypted token instead of the account identifier; and
removing the decrypted token from the communication device, wherein the decrypted token is removed from the communication device upon detecting that the application is no longer active.

13. The method of claim 12, wherein the application is detected as being no longer active when:
the user logs off the application;
the application is suspended into a background operating environment of the communication device; or
the application is closed or exited.

14. The method of claim 12, wherein the session key is generated and provided to the token request computer by a token server in response to the token server processing the request for the token.

15. The method of claim 12, wherein the memory is not part of a secure element.

16. The method of claim 12, further comprising:
  detecting that the communication device has rebooted; and
  sending, to the token request computer, a new request for a new token.

17. The method of claim 14, wherein the token server maintains a mapping of the account identifier to the token.

18. The method of claim 12, wherein the token is a format preserving token that has the same format as the account identifier.

* * * * *